July 11, 1939.　　　E. S. CORNELL, JR　　　2,165,228
METHOD OF PRODUCING INTEGRAL WROUGHT METAL VALVE BODIES
Filed Jan. 14, 1936　　　2 Sheets-Sheet 2
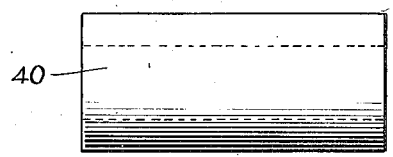
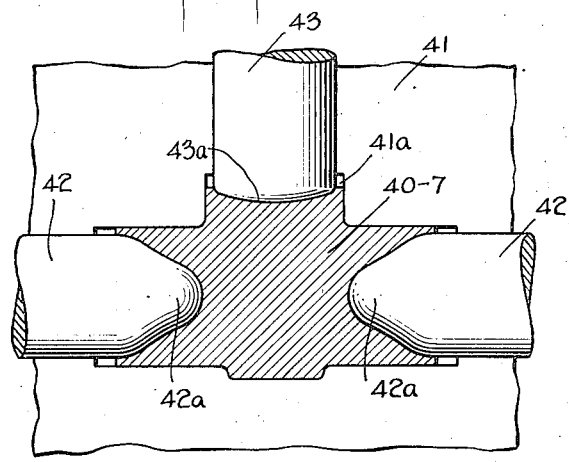
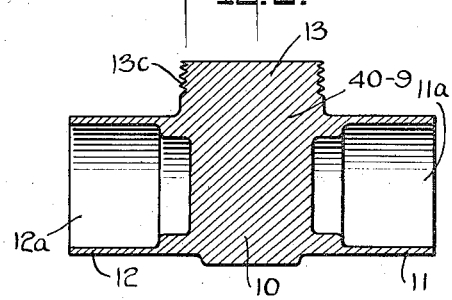
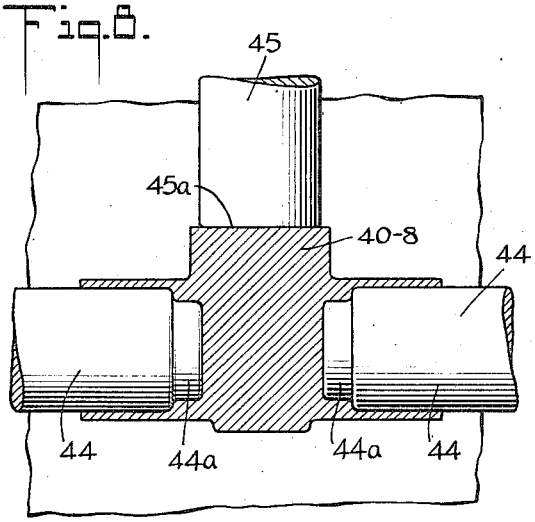
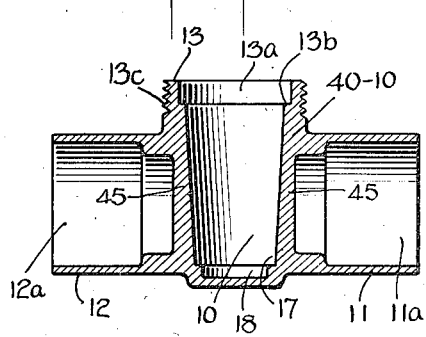
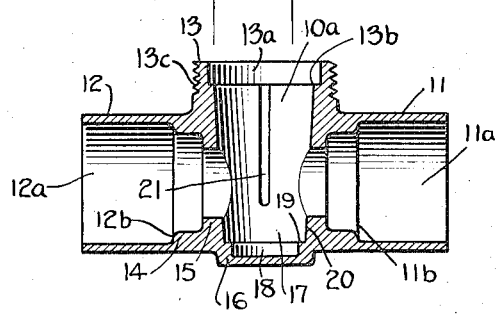
INVENTOR
Edward S. Cornell, Jr.
BY
Henry J. Lucke
HIS ATTORNEY Patented July 11, 1939

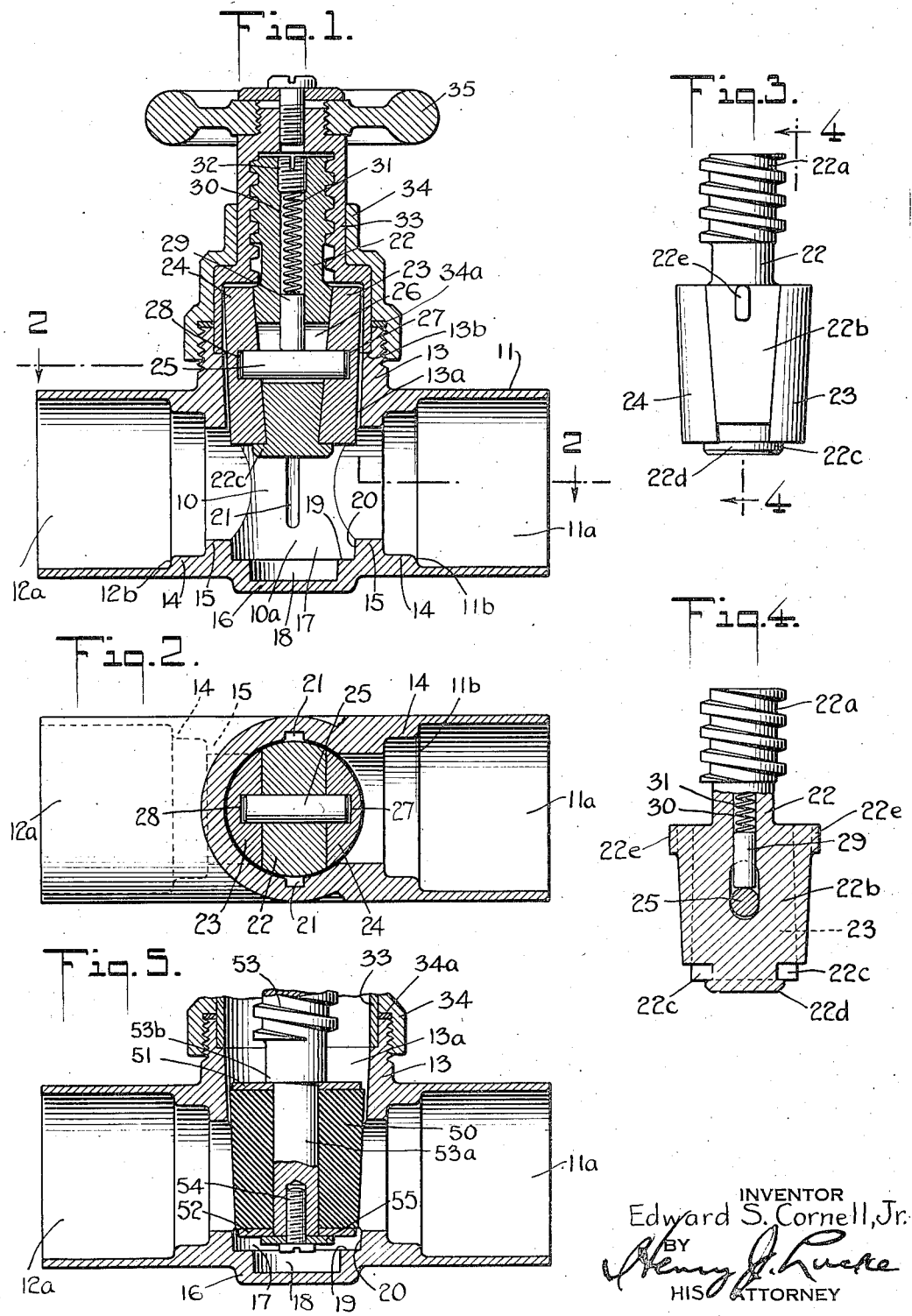

2,165,228

UNITED STATES PATENT OFFICE 2,165,228

METHOD OF PRODUCING INTEGRAL WROUGHT METAL VALVE BODIES

Edward S. Cornell, Jr., Larchmont, N. Y., assignor, by mesne assignments, to American Radiator & Standard Sanitary Corporation, New York, N. Y., a corporation of Delaware Application January 14, 1936, Serial No. 59,031

2 Claims. (Cl. 29—157)

This invention relates to valve bodies of integral cold wrought metal and to an improved method of producing the same.

Pursuant to this invention, the body of the valve comprises a body proper, end portions of the body, a lateral for receiving, securing, and housing movable valve mechanism, and suitable seating means for the movable valve mechanism; the body proper, the end portions, the lateral, and the seating means are individually integral and integral with one another without joint, the metal comprising the valve body being of the nature of copper and wrought to final status by cold working.

Embodiments of this valve body may be of the sweat joint connection type, that is to say, each end portion may be provided with a face, which is substantially smooth throughout and of substantially uniform diameter, dimensioned, with respect to the diameter of the end of a pipe or of another pipe-fitting, to provide a clearance of a magnitude to effect capillary and/or surface flow of a bonding medium when same is applied in fused status during the stage of assembly, said bonding medium, upon congealing, forming a rigid joint at the point of connection with such end of a pipe or another fitting.

Embodiments also may be provided at both or either end portion with threading for receiving, in screw relation therewith, the threaded end of a pipe or of another pipe-fitting.

The wall thickness of the end portions may be selected as desired; for sweat joint connection the wall thickness may be of reduced magnitude, inclusive of a thickness incapable of bearing a substantial thread, or the wall thickness may be increased to provide for threading comparable to threading of so-called iron piping.

In general the method of producing the above described bodies comprises subjecting a predetermined mass of metal of the nature of copper in a cold state to drastic plastic deformation; the stated mass having a proper content with respect to the mass of the ultimate valve body whereby the resultant body is provided with a lateral of desired length, cross-section, and configuration, integral in itself and integral with the walls of the body per se; and is also provided with valve seating means disposed within the valve body and being likewise integral in itself and integral with the walls of the body per se.

My invention is of especial advantage in the production of bodies of valves and the like of copper and alloys predominantly of copper content or of metal of the nature of copper, the respective sequence of integral wrought fashioning of the mass being effected in the absence of supplied heat, thus avoiding the formation of cuprous and/or other oxids and other deleterious conditions.

It is to be distinctly understood that by the term "cold wrought" is meant the subjecting of a mass of metal in the absence of supplied heat to forces which effect a flowing of the metal or a portion of same to give shape to the stated mass.

Further features and objects of the invention will be more fully understood from the following detail description and the accompanying drawings in which Fig. 1 is a central vertical section of a preferred form of integral valve body including sweat joint connecting means; the movable valve mechanism illustrated is of the general nature of a gate valve, the valve proper appearing in its fully open position;

Fig. 2 is a horizontal section taken on line 2—2 of Fig. 1;

Fig. 3 is a view in front elevation of the movable valve mechanism assembly illustrated sectionally in Figs. 1 and 2;

Fig. 4 is a partial vertical section taken on line 4—4 of Fig. 3;

Fig. 5 is a view similar to that of Fig. 1, but showing a different type of movable valve mechanism, and in a position just previous to its closed position.

Fig. 6 represents a mass of predetermined cubical content and suitable configuration from which the desired valve body is to be integrally wrought;

Fig. 7 is a diagrammatic view in central section, illustrating a suitably apertured die and a set of suitably pointed punches and a therewith cooperating plug, indicating an initial stage of treatment of the mass shown in Fig. 6;

Fig. 8 is a like diagrammatic view in central section, illustrating a subsequent stage of the treatment, the shown status of the treated mass being attained by the employment of a set of punches and cooperating plug, appropriate for the indicated treatment;

Fig. 9 shows the partially formed valve body in vertical section, just subsequent to its status in Fig. 8, having received threading on the exterior face of the lateral, and being in condition for subsequent drilling operations;

Fig. 10 shows the partially formed valve body in vertical section, after being subjected to a central machining operation;

Fig. 11 shows the valve body in vertical section subsequent to a last central drilling operation, and in final form for the reception of its component movable valve mechanism.

Referring to the preferred embodiment shown in the drawings, and with particular reference to Figs. 1, 2, 3, 4, 5, and 11; the illustrated valve body is integrally wrought from metal of the nature of copper in a cold state, and comprises a body proper 10, having a passage therethrough; an end portion 11 having a passage 11a communicating with the passage of the body proper 10, and an end portion 12, having a passage 12a communicating with the passage of the body proper; also, the lateral 13, having a passage 13a which also communicates with the passage of the body proper 10. The valve body proper 10, and the two end portions 11 and 12, respectively, together form the walls of a continuous passage through the valve body, the diameter of said passage decreasing, desirably in step formation and symmetrically, centrally of the said valve body from the respective end portions.

Such decrease in passage diameter is had by increasing the annular wall thickness, advantageously in step formation and symmetrically, inwardly of the inner ends of the respective end portions 11 and 12, and of the body portion 10, to form the concentric thickened wall portions 14 and 15. By such decrease in passage diameter the sweat-joint bonding area of each of the end portions 11 and 12 is predetermined, and provided with limiting shoulders 11b and 12b respectively.

Within the valve body at a location in the body proper 10 opposite and in substantial alignment with the intersection of the lateral passage 13a with the passage through the said body proper, is provided valve seating means. Advantageously, at this point the wall of said body proper 10 is formed with an outwardly extending boss 16 to facilitate placement of the said seating means.

Material of the body proper 10, together with material of the boss 16, serves to define the concentric seating recesses 17 and 18, the upper recess 17 being of a greater diameter than the lower recess 18 to provide an annular abutment seat 19 and an annular pressure seat 20 for a movable valve mechanism.

The lateral 13 is provided with suitable means for receiving and positioning the movable valve mechanism, and for guiding its movements relative to the valve seating means.

Such means may include, as in the illustrated embodiment, a relatively smooth, annular interior face, indicated at 13a, converging inwardly and downwardly for cooperation with the seating recesses 17 and 18, and intersecting the body proper 10, preferably centrally of the thickened portion 15. The said face 13a has its downward convergence extended through the body proper 10 and into merging relationship with the annular pressure seat 15 through the medium of the body proper interior faces 10a. Thus a continuous annular slide face, for cooperation with a slidable valve mechanism, is formed converging inwardly and downwardly from the outer extremity of the lateral 13 through the body proper 10 and terminating at the annular abutment seat 19; which continuous face is broken only by the intersection therein of the thereat communicating end passages 11a and 12a respectively. Consequently, a receiving passage for movable valve mechanism is defined through the lateral 13 and the body proper 10, transverse to the end passages 11a and 12a respectively, and terminating in the valve seating recesses 17 and 18.

Such movable valve mechanism receiving means may also include interspaced guide slots 21 for coordination with a projection on the slidable valve mechanism, to guide the movements of said mechanism relative to the valve body, and an annular recess at the upper end of the passage 13a to form a shoulder 13b which acts as a seat for a rotatable bonnet member hereinafter referred to. Also, the lateral 13 may have its outer face threaded for screw engagement with a valve housing member.

The above described valve body together with a suitable movable valve mechanism cooperate to produce a complete and operable valve of the general nature of a gate valve.

A preferred form of movable valve mechanism, illustrated in operable position within the valve body in Figs. 1 and 2 and as an independent assembly in Figs. 3 and 4, comprises a stem 22 whose upper end is threaded, as at 22a, for engagement with, and the receiving of motion from, the threaded internal face of the rotatable bonnet 23, which bonnet 23 seats upon the annular shoulder 13b of the lateral 13, and is partially enclosed by the exterior bonnet 34. The bonnet 34 is secured to the main valve body 10 preferably by screw engagement with the lateral 13, the resulting union being made water tight by insertion of packing material 34a.

The stem 22 comprises, in addition to its threaded upper end, a downwardly wedge-shaped body portion 22b having its two opposing wedge faces substantially plane for the proper reception of lateral seating pieces 23 and 24, and its remaining two opposing faces arcuate and converging downwardly to terminate in clearance recesses 22c. The seating pieces 23 and 24 fit snugly against the respective wedge faces of the stem body portion 22b, and their outer faces are so arcuated as to cooperate with the arcuate faces of the stem body portion 22b to form, as an assembled unit, a valve gate conforming to the shape of the hereinbefore described receiving passage in the lateral 13 and body proper 10 o the valve body, and adapted to fit snugly there into.

The seating pieces 23 and 24 are loosely coupled on the stem 22 within the valve body prope 10, by means of a coupling bar 25 which extend through a latitudinal slot 26 in the body portion of the stem, and has its ends extending respectively into recesses 27 and 28, suitably positioned respectively, in the bodies of the seating pieces A pin 29 is slidably positioned in the longitudina slot 30, centrally located in the body of the sten 22, and receives and transmits to the couplin bar 25 a downward thrust from coil spring 31 said spring 31 being suitably tensioned within th longitudinal slot 30 by means of a set screw 32 and said spring 31 indirectly exerting pressure o the lateral seating pieces 23 and 24 to keep ther normally in contact with the annular flange por tion 22d which forms the lower extremity of th stem 22.

The above described movable valve mechanisr is housed within the rotatable bonnet 23, which bonnet may be rotated in either direction withi the exterior bonnet 34 and on its seat 13b b means of a hand wheel 35 to effect raising an lowering of the valve stem 22 and its thereon as sembled seating mechanism; the said scre threaded upper part 22a of the valve stem ridin in up and down relationship on the correspond ingly threaded inner face of the rotatable bonnet 33. The hand wheel 35 may be rigidly secured to the upper extremity of the rotatable bonnet 33 by any well known means such as the screw engagement illustrated.

In the illustrated embodiment, rotation of the hand wheel 35, in a clockwise direction causes the valve stem 22 and its thereon assembled seating mechanism to descend into and through the aforementioned receiving passage defined through the lateral 13 and the body proper 10, and thus across the continuous passage between end portions 11 and 12, the said stem being guided in its descent by the lugs 22b which extend respectively from opposite arcuate faces of the stem body portion 22b, and engage with the respective guide slots 21, 21, in the body proper 10.

Seating of the valve mechanism is accomplished at the lowermost portion of the stroke when the bottom faces of the lateral seating pieces 23 and 24 contact the abutment seat 19, and are thereby forced into pressing engagement with the pressure seat 20 as the stem proper continues to descend into the lower recess 18, the clearance recesses 22c permitting such downward descent.

The valve shown in Fig. 5 follows that generally shown in Figs. 1 and 2, the valve body being identical with that there illustrated. Like parts are designated by like reference characters. The movable valve mechanism in this embodiment comprises a relatively thick frusto-conical rubber sleeve 50, loosely positioned between washers 51 and 52, the washer 51 being loosely received on the lower portion 53a of the valve stem 53 and bearing against the shoulder 53b, the lower washer 52, as shown, being secured by a machine screw 54 and retaining washer 55.

Upon downward movement of the movable valve stem 53, and therewith of the frusto-conical rubber sleeve 50, closure of the valve is effected by pressure exerted upon the frusto-conical rubber sleeve to thereby bulge the same in sealing relation, outwardly relative to the walls defining the passage of communication between the respective end openings 11a, 12a.

Referring now to Figs. 6, 7, 8, 9, 10 and 11 of the drawings as one exemplification of a sequence of steps embodying my invention, the mass 40 of a metal having those characteristics of copper advantageous for cold working operation is selected of predetermined cubical content dependent upon the mass of the valve body desired to be formed therefrom.

Advantageously, in the production of a valve body of general circular configuration, the configuration of the original mass 40 is selected correspondingly, under which premise the mass 40, as indicated in Fig. 6, is illustrated of circular cross-section.

An advantageous procedure in the production of a valve body corresponding to the valve body illustrated per se in Fig. 11 and Figs. 1 and 2, is by the utilization of a suitable die recessed in correspondence to the configuration to be effected, see Fig. 7. Such die, indicated as 41, is advantageously of the split type, as will be understood by those skilled in the art.

The status of the mass 40—7 shown in Fig. 7 and understood to be in a cold state is had by the use of punches 42, 42, in the instant treatment the noses 42a of the punches being suitably pointed to effect the formation of recesses at the opposite ends of the mass 40—7 at which the end openings of the body are ultimately formed. Simultaneously with the operation of the punches 42, 42, I utilize a plug 43, contoured at its effective face 43a to direct the metal, flowing under the action of the punches 42—42, into the lateral forming recess of the die, for effecting complete filling out of the peripheral end portion 41a of the lateral forming recess.

The status of the mass 40—8 indicated in Fig. 8, at a stage succeeding that shown in Fig. 7, has been effected by employment of the punches 44, 44 and the plug 45. Each of the punches 44 are provided with noses 44a, 44a of blunter profile as compared with the noses 42a of the previous punches 42, 42, the punches 44, 44, inclusive of their respective noses 44a, being of an effective volume to bring about a substantial filling of the recesses of the die 41, as appears from a comparison of Fig. 8 with Fig. 7, and to cause the flow of the mass of the metal treated in enlarging the respective recesses formed by the punches at the respective end opening portions of the mass 40—8. The effective face 45a of the plug 45 is substantially flat, and is in planar alignment with the end of the lateral forming recess to allow complete filling of the recess with the metal flowing thereinto.

The mass 40—8, as above or equivalently treated, having reached the status of final external shape, inclusive of the body portion 10, the end portions 11 and 12 and the lateral 13, the end portions 11 and 12 having the openings 11a and 12a therein, is removed from the die 41, and is then ready, as indicated at 40—9 in Fig. 9, for internal machining to provide the means for receiving and seating a movable valve mechanism. At this stage the lateral 13 may be externally threaded as at 13c for engagement with a bonnet member.

Machining of the mass 40—9 Fig. 9, to arrive at the status of 40—10 Fig. 10 may comprise drilling or boring or a like operation to form the opening 13a in the lateral 13 and the continuation of same in the nature of a smooth walled passage extending through the body proper 10 to provide at its termination the annular seating recesses 17 and 18. Formation of the rotatable-bonnet-seat 13b and the guide slots 21, 21 may be effected as part of this machining operation.

Representative of the final stage of this present method is the status of the mass 40—11 Fig. 11, presenting the finished valve body with interconnecting passages. This final status is had by a further machining of the mass, comprising drilling, boring or a like operation, whereby metal is removed from the interior walls 45, 45 to interconnect the end passages 11a and 12a, and the lateral passage 13a.

Whereas I have described my invention by reference to specific forms thereof, it will be understood that many changes and modifications may be made without departing from the spirit of the invention.

I claim:

1. The method of producing an article of cold wrought integral metal predominantly of copper content having a body proper provided with end openings and a lateral extending from the body proper intermediate the end openings thereof, which comprises subjecting a substantially cylindrical solid mass of metal predominantly of copper content to a succession of cold fashioning operations by cooperating punches and plugs within an enclosed die to externally shape the resulting article and to progressively form the said end openings, steps in the said succession of fashioning operations comprising inserting into the lateral-forming recess of the die a plug slightly less in diameter than the diameter of the said lateral-forming recess, forcing the mass of metal to flow into the annular space between said plug and the walls of said lateral-forming recess of the die for completely filling the same, removing the said plug, and closing the opening of the said lateral-forming recess of the die substantially flush with the wall endings of same, and forcing said mass of metal to completely fill the said lateral-forming recess of the die.

2. The method of producing a valve body which comprises confining a substantially straight lengthed solid blank of metal predominantly of copper content within a die recessed according to the external configuration of the resulting valve body; subjecting the opposite ends of said blank to the progressive action of punches to effect cold flow of metal into the lateral-forming recess of the die while guiding and limiting the said flow, thus forming recesses in the opposite ends of the blank and a completely filled out solid lateral extending from the blank intermediate the said end recesses; bodily removing metal from the lateral and from between the said opposite end recesses to form a passage extending through the lateral and between the said end recesses and terminating in the metal of the wall of the blank opposite the said lateral; and bodily removing metal from the interior of the thus partially formed valve body to form openings in the end walls of the respective end recesses, thus interconnecting the said end recesses with the said passage.

EDWARD S. CORNELL, JR.